United States Patent Office 3,578,607
Patented May 11, 1971

---

3,578,607
CORROSION INHIBITED PHOSPHORIC ACID COMPOSITION
Olen L. Riggs, Jr., and David W. Barnett, Ponca City, Okla., assignors to Continental Oil Company, Ponca City, Okla.
No Drawing. Filed Feb. 9, 1968, Ser. No. 704,251
Int. Cl. C23f *11/00*
U.S. Cl. 252—389     4 Claims

ABSTRACT OF THE DISCLOSURE

A corrosion inhibited phophoric acid composition comprising a phosphoric acid solution having added thereto an effective amount of the reaction product of an acidic fluoride with an organic amine having a molecular weight between about 50 and about 500.

---

This invention relates to novel and useful compositions and methods for inhibiting the corrosion of metals by phosphoric acid.

At the present time metals are protected from phosphoric acid corrosion by rubber linings and by the addition of certain inhibitors to the phosphoric acid.

It has now been unexpectedly discovered that the corrosivity of metal surfaces in contact with phosphoric acid can be markedly reduced by adding to said acid an effective amount of the material obtained by reacting an acidic fluoride with an organic amine having a molecular weight between about 50 and about 500.

The preferred organic amines which can be reacted with an acidic fluoride to produce the desired reaction product are essentially all aliphaticalkyl mono or diamines, imidazolines, guanidines, ethoxylated monoamines and ethoxylated diamines. Some specific examples are shown by the following structural formulas:

1. $R-CH_2-\underset{\underset{NH_2}{|}}{CH}-CH_3$     R=4 to 11 carbons

2. $R-NH_2$     R=18 to 22 carbons

3. $R-\underset{\underset{H}{|}}{N}-CH_2CH_2CH_2NH_2$     R=12 to 16 carbons

4. $RN\begin{cases}(CH_2CH_2O)_xH\\(CH_2CH_2O)_yH\end{cases}$     R=11 to 17 carbons 5. 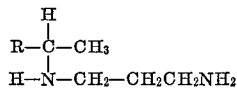     R=11 to 17 carbons 6. $(CH_2CH_2O)_xH \quad (CH_2CH_2O)_xH$
   $RNCH_2CH_2CH_2N$
   $\qquad\qquad\qquad (CH_2CH_2O)_yH$     R=10 to 16 carbons 7. $R-\underset{\underset{HNCH_2CH_2CH_2NH_2}{|}}{\overset{\overset{H}{|}}{C}}-CH_3$     R=10 to 16 carbons Hydrogen fluoride is the preferred acidic fluoride; however, other acidic fluorides such as $H_2SiF_6$ can also be used.

The mole ratio of amine to acidic fluoride can vary from about 1:3 to about 3:1, with the preferred ratio being 1:1.

The concentration of reaction product effective to give the desired results can vary from about 100 to about 1000 parts per million with the upper limit being more of an economic limit than a limit on the corrosive effect produced.

The reaction between the organic amine and the acidic fluoride is preferably carried out in the presence of isopropanol and at reflux conditions at about 80° C. The amount of alcohol present is not critical but is preferred to be in a quantity which will give the desired concentration of reaction product for addition to the phosphoric acid.

Example 1 shows a procedure which provides the desired reaction product.

EXAMPLE 1

One mole of an organic amine having the structural formula $R-\underset{\underset{H-N-CH_2-CH_2CH_2NH_2}{|}}{\overset{\overset{H}{|}}{C}}-CH_3$     R=14 carbons was weighed into a three-necked round bottom flask. One hundred fifty grams of isopropanol and one mole of acidic fluoride were added. The flask was then heated to 80° C. and allowed to reflux for 3 hours. The entire reaction product was then tested as a corrosion inhibitor for phophoric acid. The results are shown in Example 2.

EXAMPLE 2

Corrosion tests were made using the reaction product of Example 1. The tests consisted of pouring 300 ml. volumes of 75 percent by weight of $H_3PO_4$ into cells containing specimens of annealed 1020 carbon steel. The results are given in Table 1.

TABLE 1
[75% wt. $H_3PO_4$, 24° C., 2 hrs.]

|  | Reaction product 25% active concentration, p.p.m. | Wt. loss, g. | Percent protection |
|---|---|---|---|
| HF | 0 | 0.20290 | -------- |
|  | 100 | 0.14035 | 30.8 |
|  | 200 | 0.09955 | 50.9 |
|  | 500 | 0.06410 | 6.84 |
|  | 1,000 | 0.05605 | 72.3 |
| $H_2SiF_6$ | 100 | 0.16845 | 16.9 |
|  | 200 | 0.13530 | 33.3 |
|  | 500 | 0.10340 | 49.0 |
|  | 1,000 | 0.05745 | 71.6 |

Table 2 illustrates that the beneficial effect does not occur when the amines and hydrogen fluoride are present as an unreacted simple mixture.

TABLE 2
[75% wt. $H_3PO_4$, 24° C., 2 hrs.]

| Sample (unreacted) | Wt. loss, g. | Corrosion |
|---|---|---|
| Amine of Example 1 500 p.p.m., HF 500 p.p.m. | .340 | 2,200 m.p.y., 15% protection. |
| Uninhibited | .400 | 2,600 m.p.y. |

Having thus described the invention by providing specific examples thereof, it is to be understood that no undue limitations or restrictions are to be drawn by reason thereof and that many variations and modifications are within the scope of the invention.

What is claimed is:

1. A corrosion-inhibited phosphoric acid composition consisting essentially of said phosphoric acid and from about 100 parts per million to about 1,000 parts per million of the material obtained from the reaction between an acidic fluoride selected from the group consisting of hydrogen fluoride and $H_2SiF_6$, and an organic amine having a structural formula selected from the group consisting of:

1. $R-CH_2-\underset{\underset{NH_2}{|}}{C}H-CH_3$      R=4 to 11 carbons

2. $R-NH_2$      R=18 to 22 carbons

3. $R-\underset{\underset{H}{|}}{N}-CH_2CH_2CH_2NH_2$      R=12 to 16 carbons

4. $R-\underset{\underset{HNCH_2CH_2CH_2NH_2}{|}}{\overset{\overset{H}{|}}{C}}-CH_3$      R=10 to 16 carbons where R is an alkyl group and with said organic amine having a molecular weight between about 50 and about 500 and wherein said reaction is carried out under reflux conditions at about 80° C. for about 3 hours in the presence of isopropanol and the ratio of said acidic fluoride to said organic amine is from about 1:3 to about 3:1.

2. The composition of claim 1 wherein the organic amine has the following structural formula:

$$R-\underset{\underset{H-N-CH_2-CH_2-CH_2-NH_2}{|}}{\overset{\overset{H}{|}}{C}}-CH_3$$

where R=10 to 16 carbons.

3. A method of protecting metal surfaces against corrosion caused by phosphoric acid wherein said method consists essentially of adding from about 100 parts per million to about 1,000 parts per million of the product obtained by the reaction between an acidic fluoride selected from the group consisting of hydrogen fluoride and $H_2SIF_6$, and an organic amine having a structural formula selected from the group consisting of:

1. $R-CH_2-\underset{\underset{NH_2}{|}}{C}H-CH_3$      R=4 to 11 carbons

2. $R-NH_2$      R=18 to 22 carbons

3. $R-\underset{\underset{H}{|}}{N}-CH_2CH_2CH_2NH_2$      R=12 to 16 carbons

4. $R-\underset{\underset{HNCH_2CH_2CH_2NH_2}{|}}{\overset{\overset{H}{|}}{C}}-CH_3$      R=10 to 16 carbons where R is an alkyl group and with said organic amine having a molecular weight between about 50 and about 500 and wherein said reaction is carried out under reflux conditions at about 80° C. for about 3 hours in the presence of isopropanol and the ratio of said acidic fluoride to said organic amine is from about 1:3 to about 3:1.

4. The method of claim 3 wherein the organic amine has the following structural formula:

$$R-\underset{\underset{H-N-CH_2-CH_2-CH_2NH_2}{|}}{\overset{\overset{H}{|}}{C}}-CH_3$$

where R=10 to 16 carbons.

References Cited

UNITED STATES PATENTS

| | | | |
|---|---|---|---|
| 2,146,356 | 2/1939 | Schrader et al. | 260—583X |
| 3,134,815 | 5/1964 | Burkert et al. | 260—583 |
| 3,152,160 | 10/1964 | Harrison | 260—583 |
| 3,260,673 | 7/1966 | Fisher | 252—148X |
| 3,371,118 | 2/1968 | Lundeen et al. | 260—583 |

HERBERT B. GUYNN, Primary Examiner

A. I. RADY, Assistant Examiner

U.S. Cl. X.R.

21—2.5; 252—79.3, 136, 148, 370; 260—583